(12) United States Patent
Montante

(10) Patent No.: US 7,312,586 B2
(45) Date of Patent: Dec. 25, 2007

(54) BALLAST POWER SUPPLY

(76) Inventor: Charles J. Montante, 20765 Chadwick La., Brookfield, WI (US) 53045

( * ) Notice: Subject to any disclaimer, the term of this patent is extended or adjusted under 35 U.S.C. 154(b) by 0 days.

(21) Appl. No.: 11/202,614

(22) Filed: Aug. 11, 2005

(65) Prior Publication Data

US 2006/0082330 A1    Apr. 20, 2006

Related U.S. Application Data

(60) Provisional application No. 60/600,927, filed on Aug. 12, 2004.

(51) Int. Cl.
*H05B 37/02* (2006.01)

(52) U.S. Cl. .................. 315/291; 315/308; 315/DIG. 7; 315/224

(58) Field of Classification Search ................ 315/291, 315/224, 307, 209 R, DIG. 7, 308
See application file for complete search history.

(56) References Cited

U.S. PATENT DOCUMENTS

| | | | |
|---|---|---|---|
| 4,277,728 A | 7/1981 | Stevens | 315/307 |
| 4,928,038 A | 5/1990 | Nerone | 315/209 R |
| 5,677,602 A * | 10/1997 | Paul et al. | 315/224 |
| 6,094,017 A * | 7/2000 | Adamson | 315/307 |
| 6,329,761 B1 * | 12/2001 | Melis et al. | 315/209 R |
| 6,522,089 B1 | 2/2003 | Doung et al. | 315/308 |
| 6,541,923 B1 | 4/2003 | Tyson | 315/224 |
| 6,680,585 B2 * | 1/2004 | Trestman | 315/291 |
| 7,098,605 B2 * | 8/2006 | Oh | 315/291 |
| 7,109,665 B2 * | 9/2006 | Green | 315/224 |
| 2002/0125854 A1 | 9/2002 | Williamson | 318/727 |
| 2006/0049777 A1 * | 3/2006 | Kumagai et al. | 315/224 |

* cited by examiner

*Primary Examiner*—Douglas W. Owens
*Assistant Examiner*—Ephrem Alemu
(74) *Attorney, Agent, or Firm*—Fish & Richardson P.C.

(57) ABSTRACT

A high frequency ballast power supply for a high intensity discharge lamp includes a variable frequency voltage generating circuit for producing a regulated cyclical voltage. After ignition of the lamp, the variable frequency voltage generating circuit operates to vary the frequency of the cyclical voltage over the range of frequencies with a maximum frequency of less than or equal to about 375 kHz. A resonant circuit for regulating the power supplied to the lamp is interposed between the variable frequency voltage generating circuit and the lamp.

28 Claims, 9 Drawing Sheets

BALLAST POWER SUPPLY

CROSS-REFERENCE TO RELATED APPLICATION

This application claims priority of provisional application Ser. No. 60/600,927, filed on Aug. 12, 2004, which application is incorporated herein by reference.

BACKGROUND

Field of the Disclosure

The present disclosure relates generally to electrical lighting systems, and more particularly to a high efficiency, high frequency ballast power supply for high intensity discharge lamps.

High intensity discharge lamps are in widespread use. They are ignited with a short pulse, at the starting voltage (typically 2 kV or greater) superimposed across the terminals of the lamp which causes the gas in the lamp to breakdown, that is ionize, and allow a current to flow through the gas. These pulses typically are very short in duration, in the millisecond range or less. More than one pulse may be required before current flows through the lamp. Therefore, a series of pulses is applied until current flow begins. This process, which may be termed the ignition process, typically takes less than a second to complete. Those components performing the starting of the lamp are collectively referred to as the ignitor. Operation of the lamp after current has begun to flow is defined as post-ignition operation. Due to the inherently low impedance of a high intensity discharge (HID) lamp, while operating, the current through it must be controlled and limited. The collection of components that accomplish these functions is commonly referred to as a ballast.

Conventional electronic lamp ballasts operate at low frequencies, typically 100 to 400 Hz to avoid acoustic resonance, which can result in shortened lamp life or premature lamp failure. Acoustic resonance frequencies vary with different lamp types and wattages. These low frequency electronic ballasts produce a square wave output and require a large number of power transistors.

Consequently, these electronic ballasts may exhibit low efficiency because the power transistors must be driven with high current and because of the large number of power transistors needed. They also typically require a separate lamp ignition mechanism, imposing the need for separate ignitor circuitry.

Some of the foregoing problems have been addressed by high frequency electronic ballasts, such as the high frequency electronic ballast disclosed in U.S. Pat. No. 6,541,923. That ballast operates over a range of frequencies from 400 kHz to 1500 kHz with a minimum frequency of 400 kHz. The power output of the ballast is 70 watts (a relatively low power output). However, operation in that high frequency range may limit the efficiency of the electronic ballast, with a corresponding reduction in power output capability, as a result of the effects of frequency on the performance of components of the electronic ballast, such as the increase in core losses in magnetic components and the increase in bias current required to drive power transistors. In addition, operating at or above 400 kHz requires that diodes be connected in series, and in parallel with the power switching devices of the ballast. Each of these diodes has losses and their addition further reduces the ballast efficiency.

It is, therefore, desirable to provide an improved electronic ballast for high intensity discharge lamps.

It also is desirable to provide a high efficiency, high frequency ballast power supply for high intensity discharge lamps that is characterized by a higher efficiency than is provided by high frequency electronic ballasts that are currently available.

In addition, it is desirable to provide a high frequency ballast power supply for high intensity discharge lamps that is characterized by a higher power output than is provided by high frequency electronic ballasts currently available.

Furthermore, it is desirable to provide a high frequency ballast power supply for high intensity discharge lamps that includes short circuit protection.

Ideally, a high frequency ballast power supply should have a construction that is both durable and long lasting, and it should also require little or no maintenance to be provided by the user throughout its operating lifetime. In order to enhance the market appeal of the high frequency ballast power supply, it should also be of economical construction to afford it the broadest possible market. Finally, it also is desirable to obtain the foregoing advantages without incurring any substantial relative disadvantage.

SUMMARY

This disclosure relates to a high efficiency, high frequency ballast power supply for high intensity discharge lamps. The ballast power supply includes a variable frequency voltage generating circuit that produces a regulated cyclical voltage. A resonant circuit may be interposed between the variable frequency voltage generating circuit and the lamp. During the ignition process, the resonant circuit may provide a starting voltage for the lamp in some implementations. Although the frequency may exceed 375 kHz during the ignition process, in the post-ignition process, the variable frequency voltage generating circuit is operable to vary the frequency of the cyclical voltage over a range of frequencies with a maximum frequency of less than or equal to about 375 kHz.

The variable frequency voltage generating circuit may include a voltage generating circuit that produces a regulated DC voltage, an inverter for converting the DC voltage to a cyclical voltage at a frequency with a maximum frequency less than or equal to about 375 kHz during post-ignition operation, and an inverter control that controls the operation of the inverter, including varying the frequency of the cyclical voltage. During the post-ignition operation, the frequency is varied to control the current and power delivered to the lamp. In some implementations, during the post-ignition process, the variable frequency voltage generating circuit is operable to vary the frequency over a range of frequencies from about 300 kHz to about 375 kHz to produce a regulated cyclical voltage at a frequency within that range.

Further, in accordance with the invention, there is provided a lighting system that includes a high intensity discharge lamp and a high efficiency, high frequency ballast power supply and in some implementations a separate ignitor. The ballast power supply includes a variable frequency voltage generating circuit for producing a regulated cyclical voltage at a frequency within a range of frequencies with a maximum frequency less than or equal to 375 kHz during post-ignition operation, the variable frequency voltage generating circuit being operable to vary the frequency of the cyclical voltage over the range of frequencies, and a resonant circuit, which may be interposed between the variable frequency voltage generating circuit and the lamp. The resonant circuit receives the cyclical voltage and, as the frequency of the cyclical voltage is varied over the range of frequencies, varies the power and current delivered to the lamp and in some implementations produces a starting voltage for the lamp.

The ballast power supply may employ closed loop control with a sense signal, indicative of power being applied to the lamp, being fed back to the inverter control. In some embodiments, for the purpose of more reliable lamp ignition, especially in cases when a running lamp has been interrupted before reaching steady state conditions, an inhibit circuit provides interruption of the sense signal for a short time (the inhibit time) immediately following breakdown of the gas in the lamp so that maximum current is delivered to the lamp during the inhibit time resulting in more reliable lamp ignition.

With the switching frequency for the resonant inverter in the range, for example, of about 300 kHz to about 375 kHz after ignition, the ballast power supply may be operated at a sufficiently high frequency as to avoid acoustic resonance in the arc tube, but at a frequency that is low enough to operate with high efficiency, which may be on the order of 87% or higher, for example, while producing a high power output. The higher the efficiency, the more power is delivered to the lamp. Because of the relatively lower operating frequency (about 375 kHz or lower) in post-ignition operation, the ballast power supply may be more efficient, and the power output may be higher. For example, if the operating frequency is 400 kHz or greater, the switching losses are higher than for an operating frequency of 300 kHz. Also, the magnetic components of a given size are less efficient due to core losses when operated at the higher frequency. Moreover, at the lower operating frequency, less bias current may be required to drive the power switching devices of the inverter. In addition, the lower operating frequency may eliminate the need for high current diodes in series, and in parallel with the switching devices of the inverter, which adds to losses, thereby reducing efficiency of the ballast power supply.

The power transferred from the inverter to the lamp can be varied by adjusting the switching frequency of the inverter. Since in normal operation the frequency of the variable frequency voltage generating circuit not at the resonant frequency of the resonant circuit, the power output can be increased by moving the frequency closer to the resonant frequency. In some embodiments, the ballast power supply of the present invention is regulated at 575 watts.

Further, in accordance with the invention, the ballast power supply can include a ground fault detection circuit that detects fault conditions such as a short from chassis ground to a contact terminal of the high intensity discharge lamp. The ground fault detection circuit senses imbalanced current in the AC Input Line and Neutral connections and responds to such condition and causes the output power of the half bridge circuit to terminate if there is a significant imbalance.

The present disclosure teaches an improved high frequency ballast power supply for driving high intensity discharge lamps. The ballast power supply of the present invention operates in a frequency range that may result in increased efficiency and a higher output power than is achievable by other high frequency electronic ballasts for driving high intensity discharge lamps. The ballast power supply may be operated at a sufficiently high frequency as to avoid acoustic resonance in the arc tube, but low enough to minimize the losses created in components of the ballast power supply, such as the core losses of magnetic components or higher required bias current required to drive power switching devices of the ballast, both of which contribute to reduction in the efficiency of the current high frequency ballast power supplies. In addition, the lower operating frequency eliminates the need for high current diodes in series and parallel with the power switching devices of the ballast power supply thereby increasing efficiency. The power supply can include an inhibit circuit that operates to maximize current delivered to the lamp during the ignition process, resulting in more reliable ignition. The ballast power supply employs zero voltage switching which allows operation at high switching frequencies. Moreover, the ballast power supply can include a fault detection circuit that senses imbalanced current in the AC Input Line and Neutral connections and responsively causes the power output to the lamp to be terminated.

The ballast power supply of the present invention may have a construction which is both durable and long lasting, and which requires little or no maintenance to be provided by the user throughout its operating lifetime. The ballast power supply of the present invention also may have an economical construction to enhance its market appeal and to afford it a broad market. The foregoing features and advantages may be achieved without incurring substantial relative disadvantage. Other features and advantages may be apparent from the following description, the accompanying drawings and the claims.

DESCRIPTION OF THE DRAWINGS

These and other features and advantages of the present invention may be best understood with reference to the drawings, in which:

FIGS. 2-6 are to be arranged;

FIGS. 7-9 are to be arranged; and

DETAILED DESCRIPTION OF THE PREFERRED EMBODIMENT(S)

Figure 1:
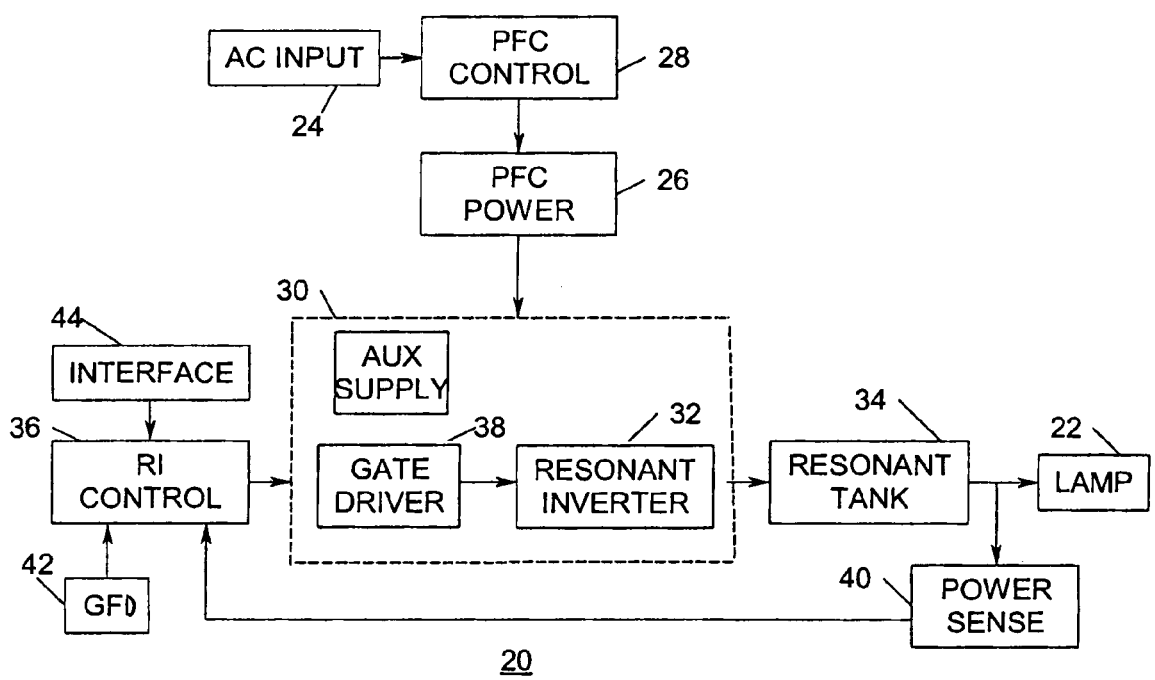
FIG. 1 is a block diagram showing an example of a high frequency ballast power supply according to the invention.

Referring to FIG. 1, a high frequency ballast power supply 20 is described with reference to an application for operating a high intensity discharge (HID) arc lamp 22. Due to the inherently low impedance of an HID lamp while operating, a ballast is needed to limit current and regulate power supplied to the lamp 22 from an input AC voltage source. The high frequency ballast power supply 20 provides regulated power to the HID lamp 22 through a series-resonant, half bridge inverter topology. Active power factor correction (PFC) is provided by boost PFC stages 26 and 28. A ground fault detection (GFD) circuit 42 causes the power drive to the lamp 22 to be discontinued in the event that the lamp high output lead is shorted to chassis ground. In addition, lamp ignition may be accomplished by the ballast power supply 20 without the need for separate ignitor circuitry, although in some implementations, a separate ignitor may still be used. The high frequency ballast power supply 20 may have a high efficiency, for example on the order of 87% (or higher) for a 120 VAC input.

General Description

More specifically, the high frequency ballast power supply 20 includes an AC Input circuit 24, a power factor correction (PFC) power circuit 26, a power factor correction (PFC) control circuit 28 and a half bridge 30 including a resonant inverter 32 that drives a resonant circuit or tank 34. The lamp 22 is connected to the output of the resonant tank 34. The half bridge 30 is controlled by a resonant inverter (RI) control circuit 36. The half bridge 30 further includes a gate driver circuit 38 that is interposed between the resonant inverter control 36 and the resonant inverter 32.

The high frequency ballast power supply 20 features a wide range AC input capability, in the range 90-264 VAC, for example. The AC Input circuit 24 converts the input AC voltage to a full wave DC voltage. The PFC power circuit 26 produces a DC output voltage that is greater than the peak of the highest input AC voltage. In one embodiment, the DC output voltage is 375VDC. The PFC power circuit 26 includes switching devices that are operated at a moderately high frequency, such as 85 kHz, for example. The duty cycle of the switching devices is modulated to force the input current to track the waveform of the rectified input AC voltage, resulting in sinusoidal input current. The duty cycle is controlled so that sinusoidal input voltage and 375VDC output voltage are maintained for all specified line and load conditions.

The PFC control circuit 28 controls the PFC power circuit 26, shaping the input current into a pseudo-sinusoidal waveform in phase with the input AC voltage. This results in minimum input current for a given power level, and with very low total harmonic distortion, on the order of less than about 40% and, preferably less than about 15%. In some cases, a total harmonic distortion as low as about 5% may be achieved.

The resonant inverter 32 may provide ignition of the lamp 22 from the off state, controls the current delivered as the lamp approaches steady state operating temperature and rated power, and regulates the power delivered to the lamp in normal operation (operation when the lamp has reached steady state operating temperature and rated power). The ballast power supply employs closed loop control with one or more sense signals, indicative of current, voltage and power being applied to the lamp, being fed back to the inverter control which responsively regulates the amount of current or power being supplied to the HID lamp. HID lamps require a high voltage (typically 2 kV or greater)) in order to initiate arc discharge (the ignition process). Initially, the lamp 22 appears as an open circuit to the ballast power supply 20 until an arc is established. Immediately after ignition, the lamp 22 appears as a very low impedance with an arc voltage of 10-20 Vrms. As the lamp 22 begins to warm and it's gasses ionize, the voltage rises to an amplitude of 90-110 Vrms over a period of thirty seconds to three minutes. The ballast power supply controls the current delivered to the lamp 22 to compensate for the changes in voltage across the lamp during normal operation, to allow operation at the rated power. In one embodiment, the ballast power supply 20 provides 575 watts to the lamp 22.

The resonant inverter 32 receives a 375VDC input from the boost PFC stage and produces a regulated cyclical output voltage, which in one embodiment is a quasi-sinusoidal output voltage, preferably, the operating frequency of which is in the range of about 300 kHz to less than about 375 kHz, to power the lamp 22. The lower operating frequency of the ballast power supply may be less than 300 kHz depending upon the type of lamp that is to be operated. Zero Voltage Switching (ZVS) is implemented by operating the half-bridge 30 above the resonant frequency of the resonant tank 34. ZVS results in high efficiency of the ballast power supply 20 and allows operation at high switching frequencies. The lamp 22 is operated at a sufficiently high frequency in order to avoid acoustic resonance in the arc tube, which could result in shortened lamp life or premature lamp failure. Conventional electronic ballasts for HID lamps operate at much lower frequencies, typically 100 Hz to 400 Hz, to avoid acoustic resonance. These low frequency ballasts require a large number of power transistors, typically produce a square wave output, and are less efficient.

The output power produced by the resonant inverter 32 can be varied by adjusting the switching frequency of the half-bridge circuit 30. Since normal operation is above the resonant frequency of the resonant tank 34, increasing the switching frequency results in lowering the output power, while decreasing the switching frequency produces higher output power. Lamp power can be regulated by adjusting the switching frequency for varying input or load voltages. Dimming of the lamp 22 can be achieved by increasing the switching frequency until the lamp power reaches the desired reduced level.

The resonant tank 34 includes an inductance L and a capacitance C, the values of which are selected to establish the operating frequency for the ballast at less than about 375 kHz. Since the impedance of the resonant tank 34 is frequency dependent, the output power of the ballast power supply 20 can be regulated or adjusted by varying the switching frequency of the half bridge 30. During normal lamp operation, the resonant tank 34 is in a series-resonant configuration, the resonant inductance and capacitance are in series with the lamp load. This results in optimum efficiency.

To ignite the lamp 22, a voltage of 2 kV or greater is required, much higher than the 375V produced by the PFC stage. This higher ignition voltage can be achieved, for example, by adding a second resonant capacitance in parallel with the lamp load for start up. The parallel capacitance is of much lower value than the series capacitance and has little effect on the circuit once the lamp is running, being effectively shunted by the series capacitance and low lamp impedance. The parallel capacitance results in a second resonant frequency in the open circuit condition, which is higher than the resonant frequency in the normal running condition. The frequency of the half bridge 30 is swept through the parallel-resonant curve, resulting in a voltage across the lamp 22 of sufficient amplitude to initiate arc discharge. The parallel capacitance is effectively shunted by a running lamp in normal operation. By sweeping the switching frequency of the half-bridge through this open circuit resonant point, a high voltage is produced across the parallel capacitance and the lamp, initiating the arc and igniting the lamp. When the lamp 22 is conducting, the resonant frequency is determined by the series resonant components and normal post-ignition operation ensues.

The high frequency ballast power supply 20 employs closed loop control with the output of the resonant tank 34 being fed back via a power sense circuit 40 to the RI control circuit 36.

The ground fault detection (GFD) circuit 42 causes the power output of the half-bridge to be terminated in response to detection of a short to chassis ground condition for the high contact terminal for the lamp 22. The GFD circuit 42 senses imbalance in current in the AC Input Line and Neutral connections and provides a signal indicating that the lamp high contact terminal is shorted to chassis ground. This signal is applied to the PFC power control 26 which shuts down the drive to the lamp 22.

The ballast power supply 20 further includes an interface circuit 44 that provides for remotely controlled fixed dimming, remotely controlled variable dimming, remotely controlled enable and a lamp status output signal. In one embodiment, remotely controlled fixed dimming is provided at a level of about 65% or less and remotely controlled variable dimming is provided at a level in the range of 100% to about 65% or less of full output. The lamp status function provides an output indicating that the lamp 22 is on.

DETAILED DESCRIPTION

Figure 10:
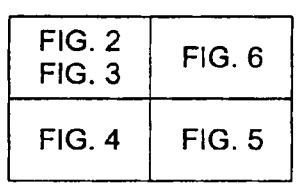
FIG. 10 shows how
Figure 11:
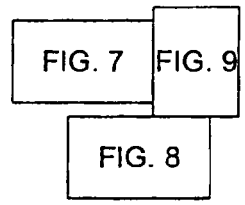
FIG. 11 shows how

In one embodiment, the components of the ballast power supply 20 provided by the present invention are mounted on a motherboard and a daughterboard that is adapted to be mounted on the mother board. FIGS. 2-6, when arranged as shown in FIG. 10, are a schematic circuit diagram of the portions of the ballast power supply 20 of the present invention that are contained on the mother board. These circuits include the AC Input 24 and the PFC control circuit 28 (FIG. 2), the PFC power circuit 26 (FIG. 3), the half bridge 30 (FIG. 4), the resonant tank 34 and the power sense circuit 40 (FIG. 5) and the GFD circuit 42 (FIG. 6) of the ballast power supply 20 of FIG. 1. The schematic circuits shown in FIGS. 2-5 are interconnected at lines A-I. FIGS. 7-9, when arranged as shown in FIG. 11, are a schematic circuit diagram of the portions of the ballast power supply 20 of the present invention that are contained on the daughter board. The circuits that are contained on the daughter board include, in FIG. 7, portions of the PFC control circuit contained within the blocks 60 and 62 in FIGS. 2 and 3, the resonant inverter control 36 (FIG. 8) and the interface 44 (FIG. 9) of the ballast power supply 20. The schematic circuits shown in FIGS. 8 and 9 are interconnected at lines J through M. The daughterboard is adapted to be mounted on and electrically connected to the mother board through mating plugs on the daughterboard and jacks on the motherboard. The plugs are labeled P1 to P17 in FIGS. 7 and 8, and the corresponding jacks are labeled J1-1 to J1-17, respectively, in FIGS. 3-6. Thus, when the daughterboard is mounted on the motherboard, plug P-1 on the daughterboard is plugged into jack J1-1 on the motherboard, plug P-2 on the daughterboard is plugged into jack J1-2 on the motherboard, etc. For purposes of discussion of the operation of the ballast power supply, it is assumed that the daughterboard is mounted on the motherboard with the plugs being inserted into respective jacks.

Figure 2:
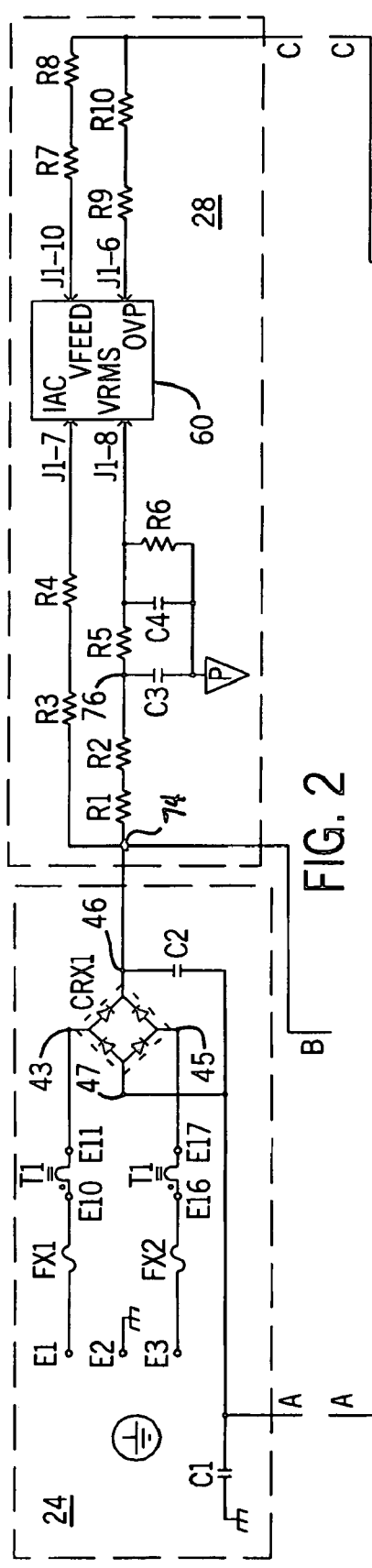
FIGS. 2-6, when arranged as shown in FIG. 10, are a schematic circuit diagram of portions of the high frequency ballast power supply contained on a mother board.
Figure 3:
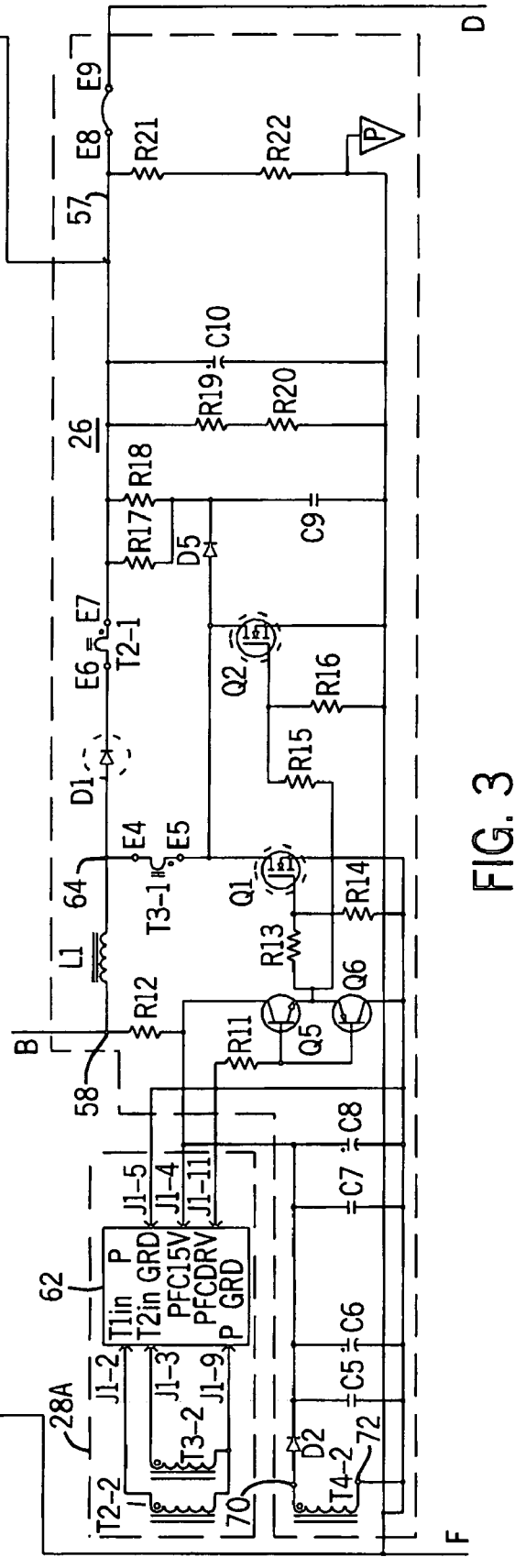
Figure 4:
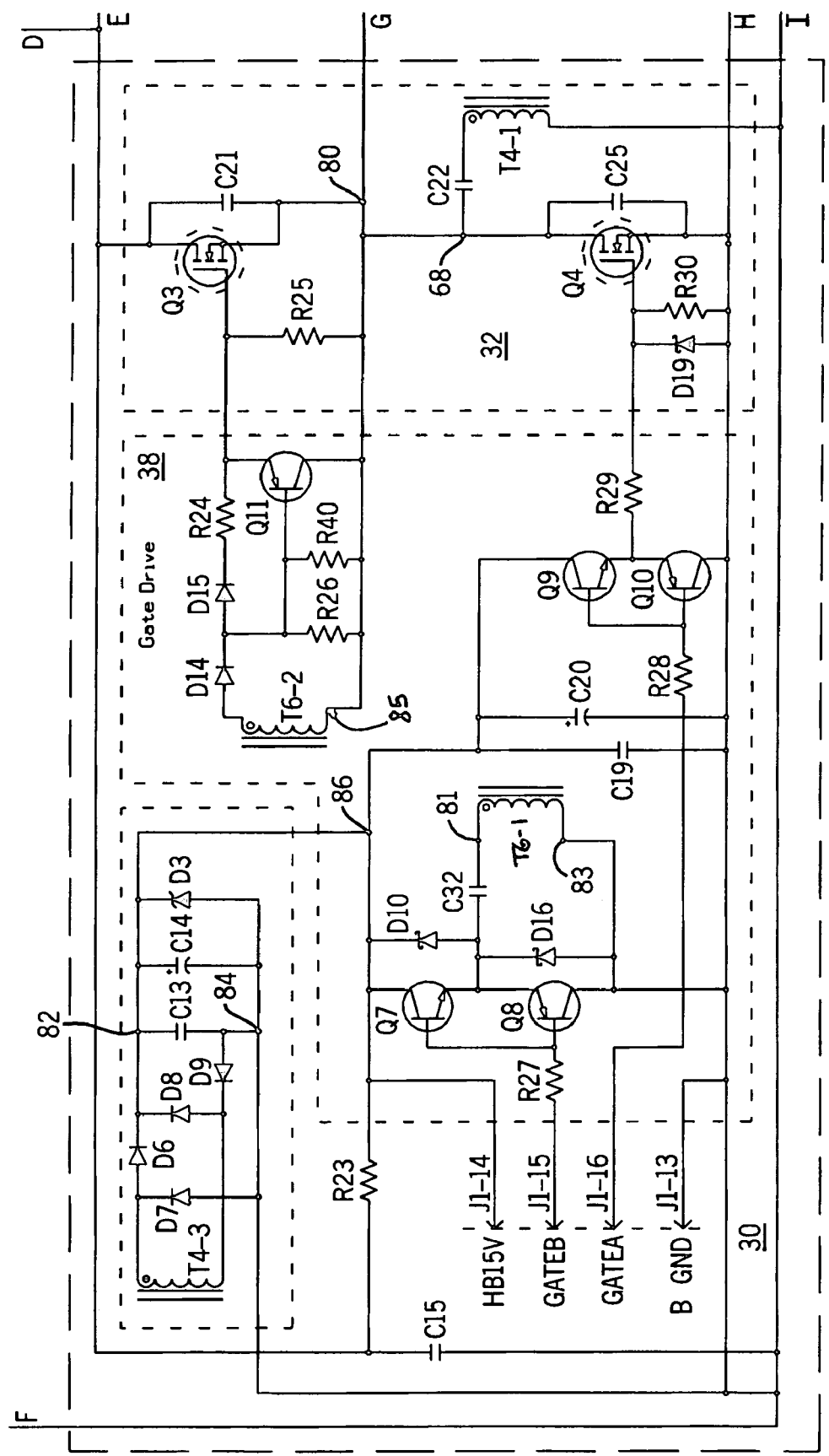
Figure 5:
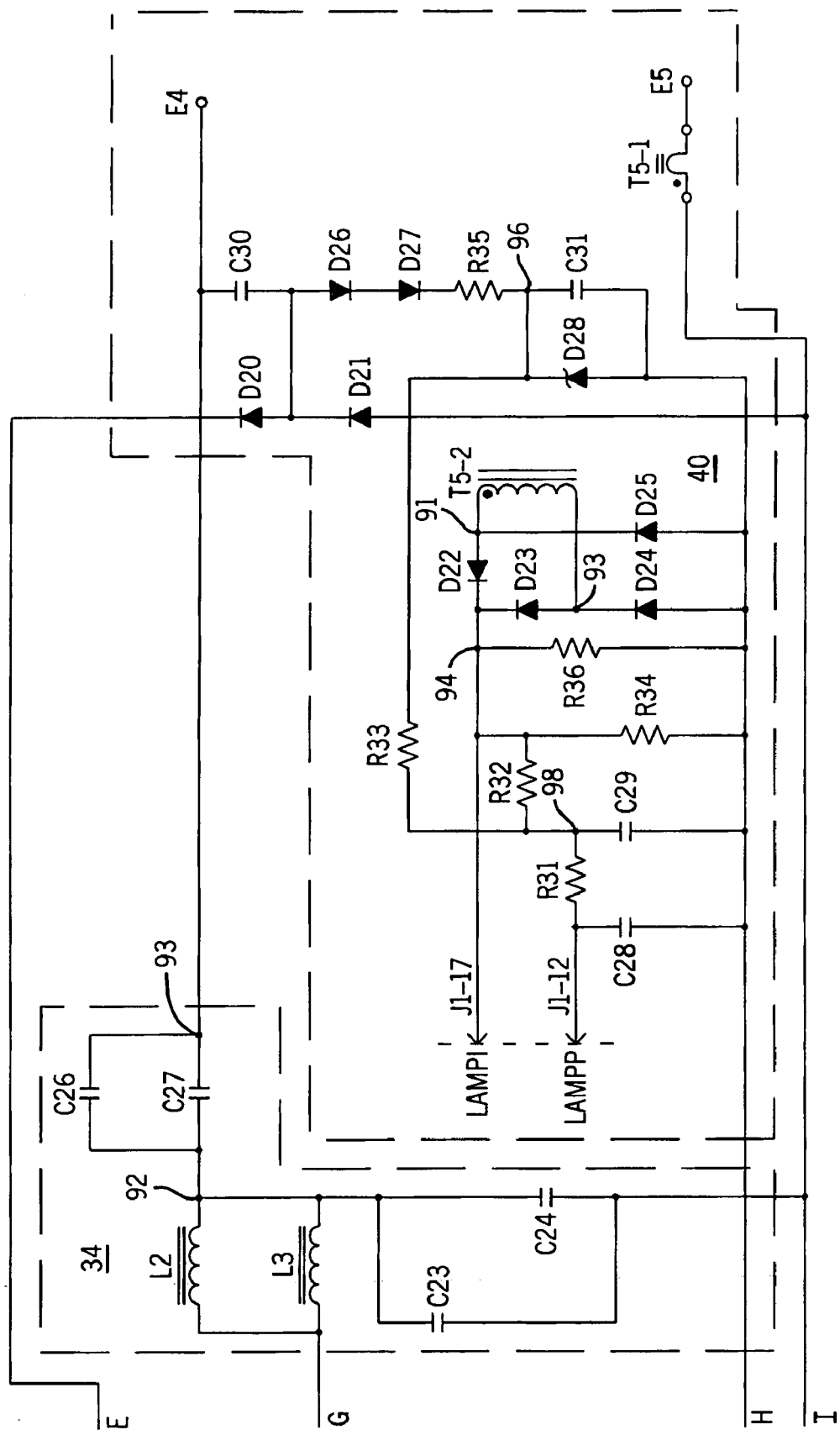
Figure 6:
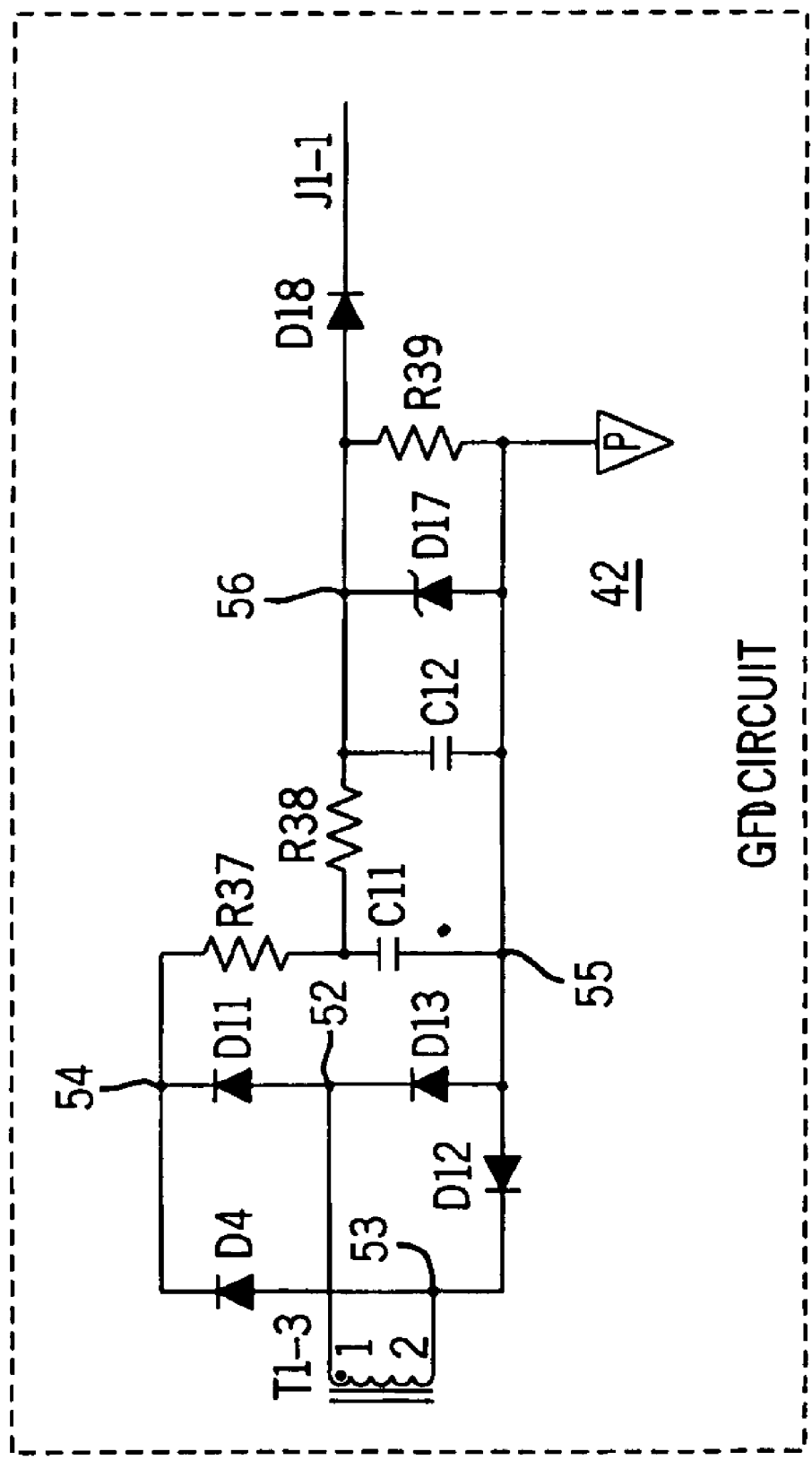
Figure 7:
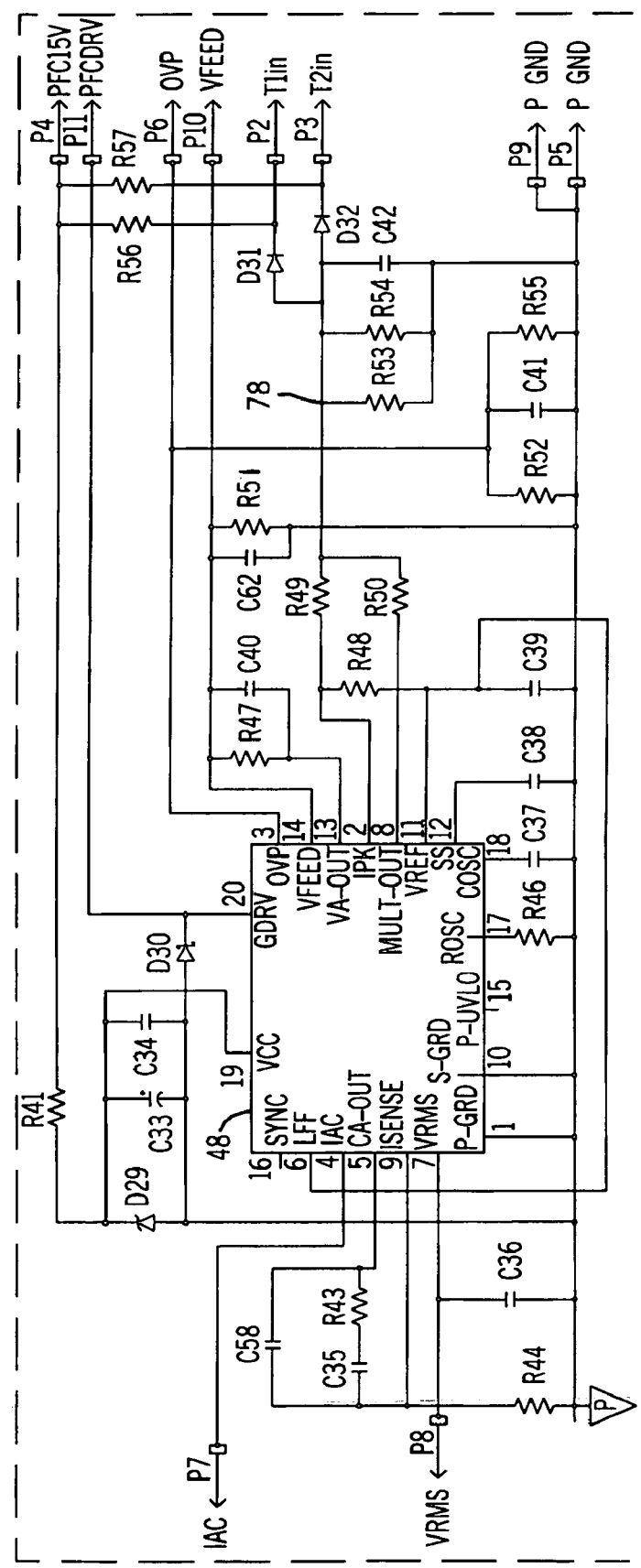
FIGS. 7-9, when arranged as shown in FIG. 11, are a schematic circuit diagram of portions of the high frequency ballast power supply contained on a daughter board that is adapted to be mounted on the mother board.
Figure 8:
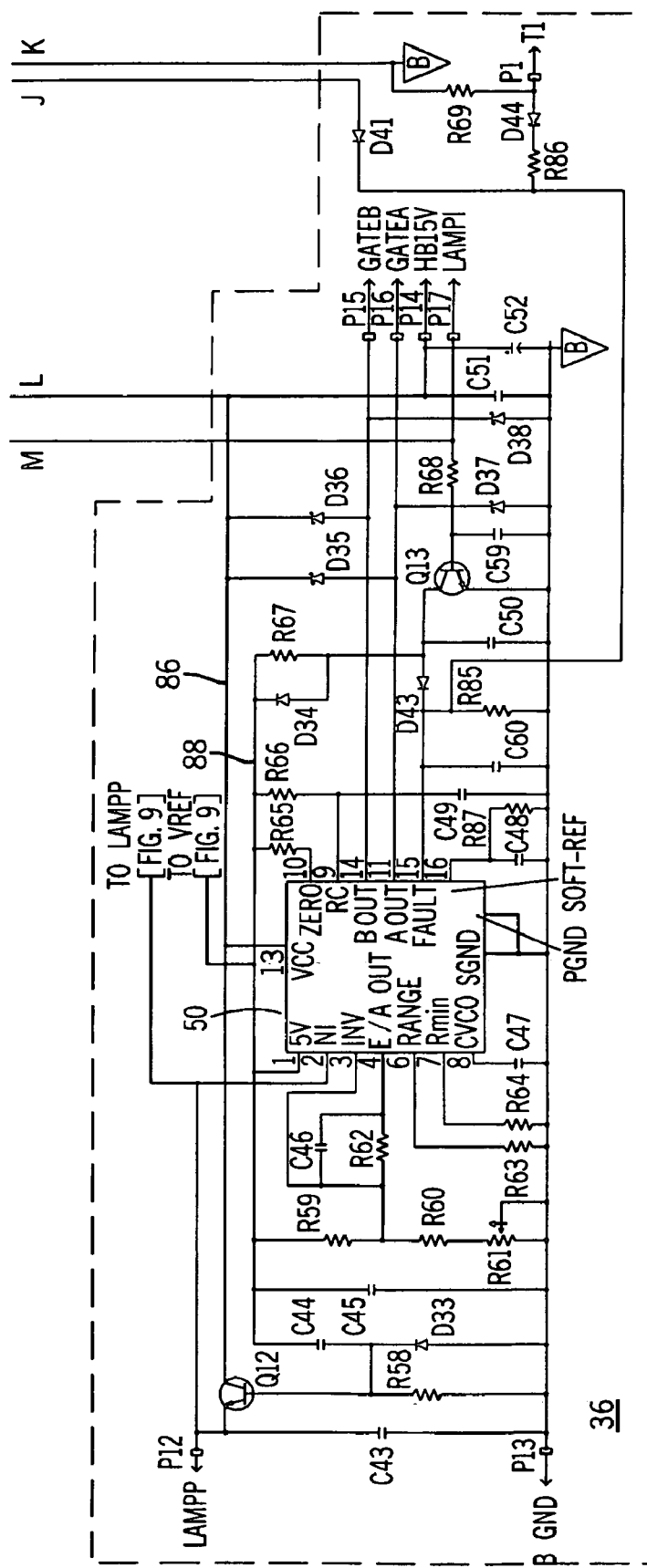
Figure 9:
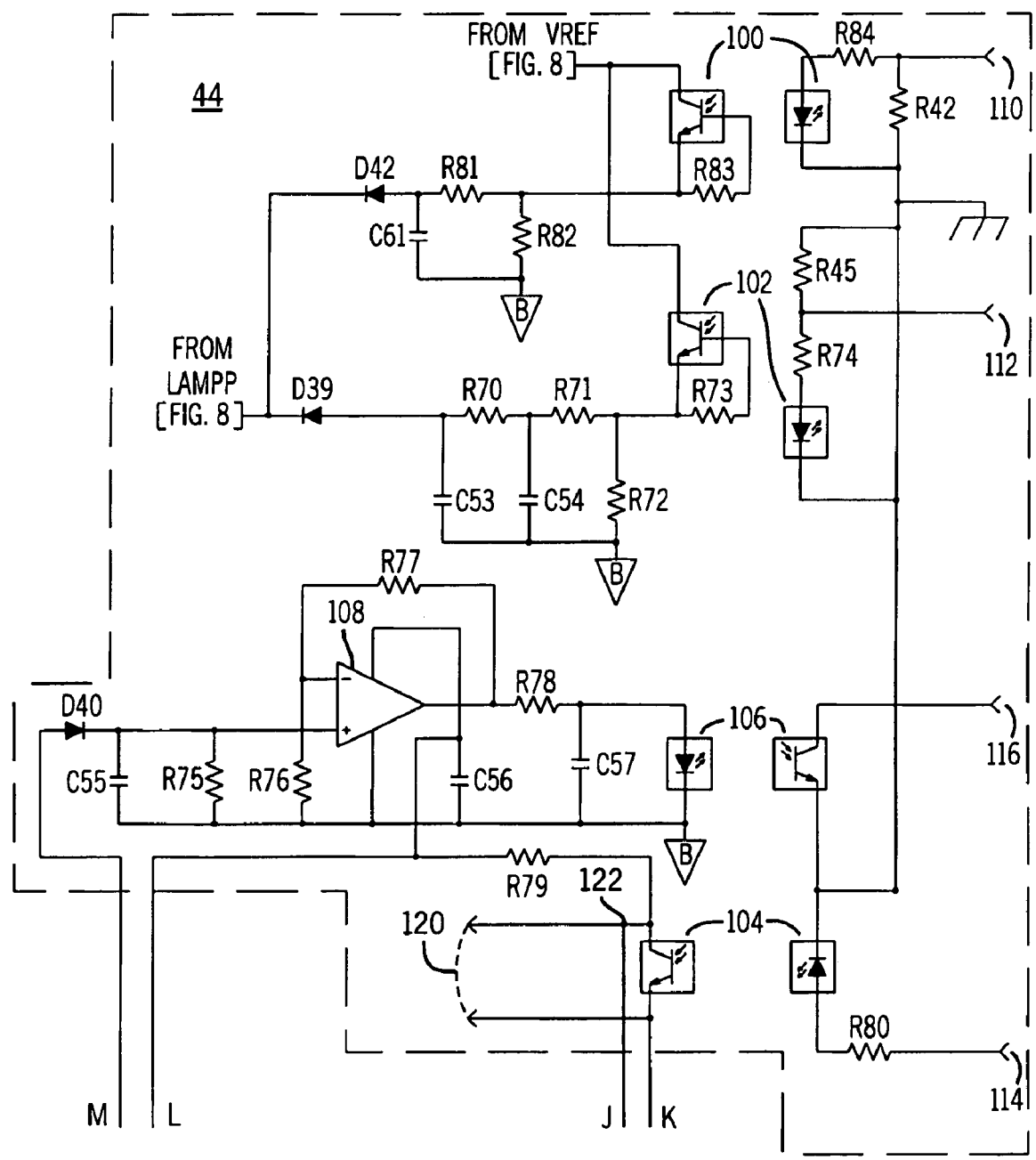

To improve readability and organization of the circuits of the ballast power supply 20 of the present invention, the schematic circuits of FIGS. 2-8 are correlated with the blocks shown in the block diagram of FIG. 1. For example, FIG. 2 contains the schematic circuit diagram for the AC Input circuit 24, a portion of the PFC control circuit 28 and the GFD circuit 42; FIG. 3 contains the schematic circuit diagram for the PFC power circuit 26 and for a portion of the PFC control circuit 28; FIG. 4 contains the schematic circuit diagram for the half bridge 30, including the resonant inverter 32 and the gate drive 38; and FIG. 5 contains a schematic circuit diagram for the resonant tank 34 and the lamp power sense circuit 40. FIG. 6 contains the schematic circuit diagram for the GFD circuit, FIG. 7 contains the schematic circuit diagram for a further portion of the PFC control circuit 28; FIG. 8 contains the schematic circuit diagram for the circuits of the resonant inverter control 36; and FIG. 9 contains the schematic circuit diagram for the interface 44.

AC Input Circuit

Referring to FIG. 2, an AC input voltage is applied to the inputs of the AC Input circuit 24 of the high frequency ballast power supply 20 at terminals E1, E2 and E3 (line, chassis ground, and neutral, respectively). The line terminal E1 and the neutral terminal E3 are coupled to input terminals 43, 45, respectively, of a bridge rectifier CRX1. The input terminals E1, E2 and E3 can be hard wired to an AC source. Fuses FX1, FX2 provide safety in the event of a ballast failure. The bridge rectifier CRX1 converts the AC input voltage to a full-wave rectified waveform at output terminals 46 and 47 of the bridge rectifier. A capacitor C1 filters out common mode noise that is generated by the high frequency ballast power supply, and a capacitor C2 filters out differential mode noise. The output voltage produced by the AC Input circuit 24, at output terminals 46 and 47 of the bridge circuit CRX1 is applied to the PFC power stage 26 at node 58 and to the PFC control circuit 28.

The AC Input circuit 24 further includes a transformer T1 having a first single turn primary winding T1-1 connected in series between the line input terminal E1 and terminal 43 of the bridge rectifier CRX1 and a second single turn primary winding T1-2 connected in series between the neutral input terminal E3 and terminal 45 of the bridge rectifier CRX1. The primary windings T1-1 and T1-2 can each be single turn primary windings. The transformer T1 has a secondary winding T1-3 connected in the GFD circuit 42 (FIG. 6) as will be described.

Ground Fault Detection Circuit

With reference to FIGS. 2 and 6, the ground fault detection (GFD) circuit 42 includes a transformer T1, a full wave rectifier bridge circuit formed by diodes D4, D11, D12, and D13, and an R-C network formed by resistors R37-R39 and capacitors C11 and C12. The transformer T1, which is connected across input terminals 52 and 53 of the bridge circuit, senses imbalance in the current in the AC Input Line and Neutral connections and produces a GFD signal if, for any reason, the "Lamp Hi" lead becomes shorted to chassis ground. The GFD signal produced by the transformer T1 is rectified by the diodes D4, D11, D12, and D13. The rectified GFD signal provided at the output terminals 54 and 55 of the bridge circuit is filtered and divided by an R-C network, formed by resistors R37-R39 and capacitors C11 and C12, that is connected between the rectifier diodes D4, D11, D12, and D13 and a node 56 which is coupled through a diode D18 to jack J1-1. A diode D17 clamps the GFD signal at 10 volts. Referring also to FIG. 8, with plug P-1 plugged into jack J1-1, the GFD signal is applied through a diode D44 and a resistor R86 to the fault input pin 15 of a power supply controller 50 of the resonant inverter control 36 to be described. The power supply controller 50 responds to the GFD signal to cause the output of the ballast power supply 20 to be shut down.

PFC Power Stage

Referring to FIG. 3, the major components of the PFC power stage 26 include an inductor L1, a pair of MOSFET power switching transistors Q1 and Q2, a diode D1, a capacitor C10 and a control circuit 48, shown in FIG. 7. One control circuit suitable for this application is the integrated circuit controller, type L4981A Power Factor Corrector, commercially available from STMicroelectronics, Geneva, Switzerland. The MOSFET transistors Q1 and Q2 can be the type SPP20N60S5 power transistor, commercially available from Infineon Technologies.

These components of the PFC power stage 26 provide a PFC boost function that enables the ballast power supply 20 to produce a DC output voltage, at a 375VDC rail 57, that is greater than the peak input AC voltage, which in the disclosed embodiment is 375VDC. The MOSFET transistors Q1 and Q2 are connected in parallel between the junction of the inductor L1 and the anode of the diode D1 at node 64 and P_Aground. Gate drive current for the MOSFET transistors Q1 and Q2 is buffered by the transistors Q5 and Q6 and resistors R13 and R15 which are connected between the gate drive output, at pin 20, of the control circuit, referred to hereinafter as power factor controller 48 (FIG. 7), and the gates of the MOSFET transistors Q1 and MOSFET Q2. The capacitor C10 is connected between the 375VDC rail 57 and P_ground.

With the MOSFET transistors Q1 and Q2 turned on, energy from the input line is stored in the inductor L1 as the current rises. Power is supplied to the load (i.e., lamp 22) from the capacitor C10 connected to the 375VDC rail 57. The diode D1 prevents the capacitor C10 from being discharged by the MOSFET transistors Q1 and Q2. Power is delivered to the load from the input line through the inductor L1 and the diode D1 when the MOSFET transistors Q1 and Q2 are off. Excess energy is stored in the capacitor C10 as the current in the inductor L1 decreases when the MOSFET transistors Q1 and Q2 are off.

Bipolar transistors Q5 and Q6, along with resistors R11, R13, and R15, buffer the gate drive current required by the transistors Q1 and Q2. A snubber network, which is composed of a diode D5, a capacitor C9, a resistor R17 and a resistor R18, which is connected between the 375VDC rail 57 and P_ground, reduces losses in the transistors Q1 and Q2 during turn-off transitions.

Operating power for the power factor controller 48 is provided by an auxiliary power circuit including a transformer T4. The primary winding T4-1 of the transformer T4 is connected to the midpoint of the half-bridge 30, at node 68, through a blocking capacitor C22 as shown in FIG. 4. The transformer T4 has two secondary windings T4-2 and T4-3. The secondary winding T4-3 provides a 15V housekeeping voltage for the half bridge 30 (FIG. 4) as is described below. The secondary winding T4-2 provides housekeeping and gate-drive voltage for the PFC power circuit 26 in normal operation. The secondary winding T4-2 of the transformer T4 has one terminal 70 connected through a diode D2 to the supply voltage input, pin 19, of the power factor controller 48 and a terminal 72 connected to P_ground. While the ballast power supply 20 is operating, the transformer T4 produces a voltage across the secondary winding T4-2 that is rectified by the diode D2, providing at the cathode of diode D2, a 15VDC supply input voltage for the power factor controller 48. A capacitor C6, connected between the cathode of diode D2 (and the supply input voltage pin 19 of the power factor controller 48) and P_ground, stores a 15 volt supply voltage required to operate the power factor controller 48. The capacitor C6 is charged by the rectified input voltage through a resistor R12, shown in FIG. 3, for initial turn-on.

PFC Control Stage

Referring to FIGS. 2 and 7, the PFC control circuit 28 includes the power factor controller 48 (FIG. 7), resistors R1-R10, and resistors R51, R52 and R55 (FIG. 6), capacitors C3-C4 and capacitors C41 and C62 (FIG. 7). The circuits shown in FIG. 7, including the power factor controller 48, are contained within the blocks 60 and 62 in respective FIGS. 2 and 3. Like labels are provided in FIGS. 2, 6 and FIG. 7 for the inputs and the outputs of the blocks 60 and 62. Block 60 includes inputs IAC, VRMS, VFEED and OVP, for signals that are applied to the power factor controller 48 (FIG. 7). Block 62 includes inputs T1in and T2in that couple current sensing transformers T2 and T3 to inputs of the power factor controller 48, power supply voltage PFC15V and P_ground for the power factor controller 48, and a drive signal output PFCDRV for the MOSFET transistors Q1 and Q2. The inputs and functions of block 60 are described first.

IAC Input

With reference to FIGS. 2 and 7, the resistors R3 and R4 are connected in series between the output of the bridge circuit CRX1 at node 74 and the AC current input IAC, pin 4, of the power factor controller 48. The resistors R3 and R4 provide a current signal IAC, representing the shape of the rectified input voltage.

VRMS Input

This VRMS signal is a feed-forward input for the power factor controller 48. The resistors R1, R2 and R5 are connected in series between the output of the bridge circuit CRX1 at the node 74 and a VRMS input, pin 7, of the power factor controller 48. Capacitor C3 is connected between the junction of resistors R2 and R5 and P_ground. Resistor R6 and capacitor C4 are connected in parallel between the VRMS input of the power factor controller 48 and P_ground. The resistors R1, R2, R5, R6 and capacitors C3 and C4 form a divider and filter that provides a signal Vrms that is indicative of the RMS value of the rectified input voltage.

Vfeed Input

The Vfeed signal is indicative of the amplitude of the output voltage of the boost PFC stage at the 375VDC rail 57. The resistors R7 and R8 are connected in series between the 375VDC rail 57 and the pin 14, of the power factor controller 48. Parallel-connected resistor R51 and capacitor C62 are connected to the feedback input pin 14 of the power factor controller 48. The resistors R7, R8, the resistor R51, and the capacitor C62 form a divider and filter that provides a feedback signal Vfeed for the power factor controller 48 that is indicative of the output voltage of the boost PFC stage at the 375VDC rail 57. The power factor controller 48 responds to variations in the Vfeed signal to adjust the duty cycle of the transistors Q1 and Q2 to maintain the PFC output voltage at 375VDC, measured across the capacitor C10.

OVP Input

The OVP signal, like the Vfeed signal, is indicative of the amplitude of the output voltage being provided by the boost PFC stage. The resistors R9 and R10 are connected in series between the 375VDC rail 57 and the overvoltage protection input (OVP), pin 3, of the power factor controller 48. The resistors R52 and R55 are connected in parallel with the capacitor C41 between the OVP input pin 3 of the power factor controller 48 and P_ground. The resistors R9, R10, R52, R55, and the capacitor C41 form a divider and filter that provides an overvoltage condition signal OVP, indicative that the amplitude of the output voltage being provided by the boost PFC stage is excessive. The OVP signal is applied to the OVP input pin 3 of the power factor controller 48. The power factor controller 48 responds to the OVP signal in the event of an over-voltage condition to turn off the MOSFET transistors Q1 and Q2.

Current Sensing

With reference now to FIGS. 3 and 7, the inputs and functions of block 62 are described. An operating voltage at 15VDC (PFC15VDC) and ground (PGND) are connected to respective pins 19 and 1 of the power factor controller 48. The current sensing transformer T2 includes a primary winding T2-1 connected in series with the diode D1 and a secondary winding T2-2 that is connected between input T1in and P-ground of block 62. The primary winding T2-1 can be a single winding primary. The current sensing transformer T3 includes a primary winding T3-1 connected in series with the MOSFET power switching transistors Q1 and Q2 and a secondary winding T3-2 that is connected between input T2in and P-ground of block 62. The primary winding T3-1 can be a single winding primary.

Resistors R53 and R54 and a capacitor C42 are connected in parallel between a node 78 and P_ground. The capacitor C42 provides noise filtration. Diode D31 and the secondary winding T2-2 of the transformer T2 are connected in series between the node 78 and P_ground. Diode D32 and the secondary winding T3-2 of the transformer T3 are connected in series between node 78 and P_ground.

The transformers T2 and T3 and the resistors R52 and R54 sense the current, producing current sense signals that are rectified and summed by the diodes D31 and D32. The resulting summed current sense signal, representing the current in the inductor L1, is applied through resistor R50 to pin 8 of the power factor controller 48. The power factor controller 48 responds to the current sense signal to adjust the duty cycle of the MOSFET transistors Q1 and Q2 to force the sensed current to follow the waveform sensed by the IAC input, resulting in sinusoidal input current. The current sense signal is also compared to a reference value to provide peak current limiting, shutting off the MOSFET transistors Q1 and Q2 if the sensed current exceeds a threshold programmed by a resistor R49.

PFCDRV Output

Referring to FIGS. 3 and 7, the MOSFET transistors Q1 and Q2 are driven by a gate drive control signal provided by the power factor controller 48 at the output gate driver, pin 20 (FIG. 7) and provided at output PFCDRV of block 62. The output PFCDRV, and thus the output gate driver pin 20, is connected through a resistor R11 to the bases of bipolar transistors Q5 and Q6. The junction of the emitters of transistors Q5 and Q6 is coupled through a resistor R13 to the gate of transistor Q1 and through a resistor R15 to the gate of transistor Q2. The transistors Q5 and Q6 buffer the gate drive signal to provide the necessary current to switch the power MOSFET transistors Q1 and Q2.

Programming and Compensation

Referring to FIG. 7, an external RC network, including series connected capacitor C35 and resistor R43, along with a capacitor C58 and a resistor R44, is connected between the current amplifier output CA-OUT, pin 5, of the power factor controller 48 and P_ground. The RC network provides feedback compensation for an internal current error amplifier of the power factor controller 48. A resistor R47 and a capacitor C40, which are connected between and the VFEED input, pin 14, and the VA-OUT output, pin 13, of the power factor controller 48, provide feedback compensation for a voltage error amplifier of the power factor controller 48. The switching frequency is programmed with a resistor R46 and a capacitor C37, which are connected between respective inputs Rosc, pin 17, and Cosc, pin 18, of the power factor controller 48 and P_ground. A capacitor C38, which is connected between a soft start time input SS, pin 12, of the power factor controller 48 and P_ground, programs a soft-start delay so that the PFC output voltage rises slowly at turn-on.

Resonant Inverter Control

Referring to FIG. 8, the resonant inverter control 36 provides gate drive signals for the resonant inverter 32 (FIG. 4) and controls other functions related to the operation of the resonant inverter 32, including lamp ignition, sensing lamp power and power regulation. The resonant inverter control 36 includes a controller 50, transistor Q12, transistor Q13 and associated passive components. One circuit suitable for this application is the type UC3861DW integrated circuit Resonant-Mode Power Supply Controller, commercially available from Texas Instruments Incorporated, Dallas Tex.

A dc operating voltage at 15VDC produced on a 15VDC rail 86 by an auxiliary supply (FIG. 4) is applied to the bias input VCC, pin 13 of the power supply controller 50. When the power supply controller 50 is energized, a 5V reference voltage output is provided at pin 1 of the power supply controller 50. Pin 1 of the power supply controller 50 is coupled by a Vref rail 88 to the base of the transistor Q12 through a capacitor C44. The capacitor C44 is connected in a charging path including a resistor R58 between the Vref rail 88 and B_ground. A capacitor C45 connected in parallel with the capacitor C44 and the resistor R58. A diode D33 provides a discharge path for the capacitor C44. The transistor Q12 has its emitter collector circuit connected between a terminal LAMPP and the 15VDC rail 86. The transistor Q12 is connected to pass a buffered voltage to the non-inverting input, pin 2 of an internal error amplifier of the power supply controller 50 to force the output frequency to a programmed maximum value.

Gate Drive Outputs

The power supply controller 50 produces gate drive outputs GATEA, GATEB at pins 11 and 14 of the power supply controller 50 (FIG. 8). These gate drive outputs 11 and 14 are connected to the inputs of the gate driver 38 (FIG. 4) by plug/jack pairs P-15/J-15 and P-16/J1-16.

Programming and Compensation

In addition, a voltage divider, formed by resistors R59 and R60 and a potentiometer R61, is connected between the Vref rail 88 and B_ground. The junction of resistors R59 and R60 is connected to inverting input, at pin 3, of the power supply controller and is coupled through parallel connected resistor R62 and capacitor C46 to the error amplifier output E/A, at pin 4, of the power supply controller 50, for compensating the error amplifier of the power supply controller 50. A resistor R63, a resistor R64, and a capacitor C47, which are connected between respective pins 7 and 8 of the power supply controller 50 and B_ground, program the minimum and maximum operating frequencies. In one embodiment, the switching rate during post-ignition is in the range of from about 300 kHz to less than about 375 kHz and is preferably about 300 kHz. However, the lower frequency for the operating range can be less than 300 kHz depending upon the type of lamp that the ballast power supply is used to operate. In either case, the maximum output current is controlled by choosing an appropriate minimum frequency in conjunction with the resonant tank components so that the switching frequency is greater than the resonant frequency of the resonant tank 34.

The values of the resistors R63 and R64, and of the capacitor C47 are selected to establish the minimum and maximum operating frequencies. Maximum output current can be controlled by choosing an appropriate minimum frequency in conjunction with the resonant tank components.

A resistor R66 and a capacitor C49, which are connected in series between the Vref rail 88 and B_ground, and to an RC input, at pin 9 of the power supply controller 50, program the dead time between the alternating gate drive pulses, allowing the resonant current to discharge the MOSFET transistor drain-source voltage before turn-on, allowing zero voltage switching.

The base of the transistor Q13 is coupled through a resistor R68 to a plug P17 to receive an input LAMPI produced by the power sense circuit 40 (FIG. 5) and through a capacitor C59 to B_ground. The collector of transistor Q13 is connected through a resistor R67 to the Vref rail 88 and through a diode D43 to a fault input, at pin 15, of the power supply controller 50. A capacitor C50 is connected between the collector of the transistor Q13 and B_ground. The emitter of transistor Q13 is connected to B_ground. The transistor Q13 enables detection of fault conditions, allowing the gate drive outputs of the power supply controller 50, at pins 11 and 14, to be disabled, shutting down the half-bridge 30. A diode D34, is connected in parallel with the resistor R67 to provide a discharge path for the capacitor C50 in the event of a fault condition.

Half-Bridge

Resonant Inverter

Referring to FIG. 4, the resonant inverter of the half-bridge 30 includes power switching MOSFET transistors Q3 and Q4 which chop the 375VDC input from the PFC power stage 26 into a rectangular pulse train of 375 volt positive pulses. The duty cycle of each transistor switch is maintained at nearly 50% by the controller 50 of the resonant inverter control 36. One circuit suitable for this application is the type UC3861DW integrated circuit Resonant-Mode Power Supply Controller, commercially available from Texas Instruments Incorporated, Dallas Tex. The MOSFET transistors Q3 and Q4 can be the type IXFH32N50 power transistor, commercially available from IXYS Corporation.

The gate driver circuit 38 of the half-bridge 30 includes separate gate drive buffer circuits for the MOSFET transistors Q3 and Q4, interposed between the drive outputs GATEB and GATEA, pins 14 and 11, of the power supply controller 50 (FIG. 8), and the gates of the MOSF2 ET transistors Q3 and Q4. The high side MOSFET transistor Q3 requires a level-shifted gate signal due to its 375V floating source. Accordingly, the gate drive buffer circuit for the high-side the MOSFET transistor Q3 includes a level shifting circuit, including a transformer T6 and a DC-blocking capacitor C32.

The drain-to-source circuit of the MOSFET transistor Q3 is connected between the 375VDC rail 57 and the midpoint 80 of the half bridge 30. The drain-to-source circuit of the MOSFET transistor Q4 is connected between the midpoint 80 of the half bridge 30 and B_ground. Capacitors C21 and C25 are connected across each MOSFET from drain to source.

Gate Drive Circuits

The gate drive buffer circuit for the low side MOSFET transistor Q4 includes transistors Q9, Q10 and resistors R28 and R29. A diode D19 clamps the gate voltage and a resistor R30 provides pull-down. Similarly, the gate drive buffer circuit for the high side MOSFET transistor Q3 includes transistors Q7 and Q8 and resistors R27 and R24. The level-shifting circuit for the high side gate drive buffer circuit includes the transformer T6, the output of which is connected to the gate of the transistor Q3 through diodes D14, D15 and the resistor R24. The transformer T6 has a primary winding 6T-1 having one terminal 81 coupled through the DC blocking capacitor C32 to the emitters of transistors Q7 and Q8 and a second terminal 83 connected to B_ground. The secondary winding 6T-2 of the transformer 6T has one terminal 83 connected between the anode of diode D14 and a second terminal 85 connected to the midpoint 80 of the half-bridge 30. When the gate drive signal GATEB is at a logic low level, the transistor Q3 is turned off by PNP transistor Q11. The base of transistor Q11 is connected to the junction of the diodes D14 and D15 and through parallel connected resistors R26 and R40 to the midpoint 80 of the half-bridge 30. The transistor Q11 has an emitter-collector circuit connected between the gate of the MOSFET transistor Q3 and the midpoint 80 of the half-bridge 30.

The MOSFET transistors Q3 and Q4 are driven alternately by the drive outputs GATEA and GATEB, with a small dead time of about 300 ns between transitions to facilitate zero voltage switching. The capacitors C21 and C25 reduce switching losses during turn-off transitions. It is pointed out that in contrast to some ballast circuits, such as that disclosed in U.S. Pat. No. 6,541,923, external high current diodes and/or resistors are not required to be connected in series and parallel with the switching transistors. The intrinsic diodes of the MOSFET transistors are capable of clamping the resonant current during transitions without excessive loss.

Operating power for the half bridge 30 is provided by an auxiliary power circuit including the transformer T4, the primary winding T4-1 of which is connected to the midpoint 80 of the half-bridge 30 through a blocking capacitor C22. The secondary winding T4-3 provides a 15V housekeeping voltage for the resonant inverter 32. The auxiliary power circuit includes diodes D6-D9 which are connected as a full wave bridge rectifier across the secondary winding T4-3. The bridge rectifier has a first output terminal 82 connected to supply 15VDC to the 15VDC rail 86 and a second output terminal 84 connected to B_ground. Capacitors C14 and C13 are connected in parallel between the terminals 82 and 84. The 15VDC supply for the resonant inverter 32 is stored by the capacitor C14 after being full-wave rectified by the diodes D6-D9. A bootstrap resistor R23 provides a housekeeping voltage upon start-up for the resonant inverter 32. A resistor R12 (FIG. 3) charges the storage capacitor C6.

Resonant Tank

Referring to FIG. 5, the resonant tank 34 includes series inductance and series capacitance which are connected between the midpoint 80 of the half bridge, the output of the resonant inverter, and the "high" output terminal E4 of the ballast power supply 20. The resonant inductance includes parallel-connected inductors L2 and L3. The series capacitance includes parallel-connected capacitors C26 and C27. In one embodiment, the values for L and C of the resonant tank 34 are selected to resonate at 150 kHz. The values of the series inductance and capacitance are selected so that the operating frequency is above the resonant frequency. Thus, the resonant inductance is the dominant impedance between the half-bridge 30 and the lamp load 22.

The capacitors C26 and C27 of the series capacitance block DC voltage to the lamp 22 and resonate with the inductance provided by the inductors L2 and L3 to convert the applied 375V, 50% pulse from the half-bridge 30 into quasi-sinusoidal power that is delivered to the lamp 22. Since the impedance of the resonant tank 34 is frequency dependent, the output power of the ballast power supply 20 can be regulated or adjusted by varying the switching frequency of the half-bridge 30.

In some implementations, the junction of the inductance and the capacitance at node 92 is connected through a parallel capacitance to B_ground. The parallel capacitance is provided by parallel-connected capacitors C23 and C24 which are connected effectively in parallel with the lamp 22 prior to ignition, the lamp exhibiting an open circuit condition prior to ignition. In this open circuit condition, the switching frequency of the half-bridge is swept through the parallel-resonant curve, resulting in a voltage across the lamp of sufficient amplitude to initiate arc discharge. When the lamp 22 is ignited, the parallel capacitance is effectively shunted by the running lamp in normal operation. In implementations without parallel capacitance, the ignition voltage may be generated by an external ignitor.

Lamp Power Sense

With continued reference to FIG. 5, the power sense circuit 40, which can be considered as part of the resonant inverter control 36, includes a transformer T5, diodes D22-D28, resistors R34-R36, a capacitor C30. The primary winding T5-1 of the transformer T5 is connected in series with the "low" output terminal E5 of the ballast power supply 20, which is connected to B_ground. The primary winding T5-1 of the transformer T5 can be a single turn primary. The secondary winding T5-2 of the transformer T5 is connected across inputs 91 and 93 of a full wave rectifier bridge formed by diodes D22-D25. The output of the bridge rectifier, at terminal 94, is connected to jack J1-17 to provide a lamp current sense signal LAMPI to the resonant inverter control 36 (FIG. 8). Resistors R34 and R36 are connected in parallel between the bridge output terminal 94 and B-ground. The capacitor C30 and the resistor R35 are connected in series with diodes D26 and D27 between the output terminal E4 and B_ground. Diodes D20 and D21 are connected in series between B_ground and the 375VDC rail 57, with the junction of the diodes D20 and D21 connected to the junction of the capacitor C30 and the diode D26. The diode D21 provides a discharge path for the capacitor C30 when the lamp voltage is negative. The diode D20 clamps the undivided voltage signal to the 375V rail 57. Resistors R33 and R31 are connected in a series circuit path between the junction 96 of resistor R35 and capacitor C31 and a jack J1-12 which receives plug P12 to extend a lamp power signal LAMPP to the resonant inverter control 36 (FIG. 8). The resistor R32 is connected between the junction 98 of resistors R33 and R31 and the jack J1-17. The junction 98 is connected through the resistor R31 to the jack J1-12 which receives the plug P12 (FIG. 8) to extend the lamp power signal LAMPP to an error amplifier non-inverted input NI, pin 2, of the power supply controller 50 (FIG. 8). A capacitor C28 is connected between the jack J1-12 and B_ground.

Figure 12:
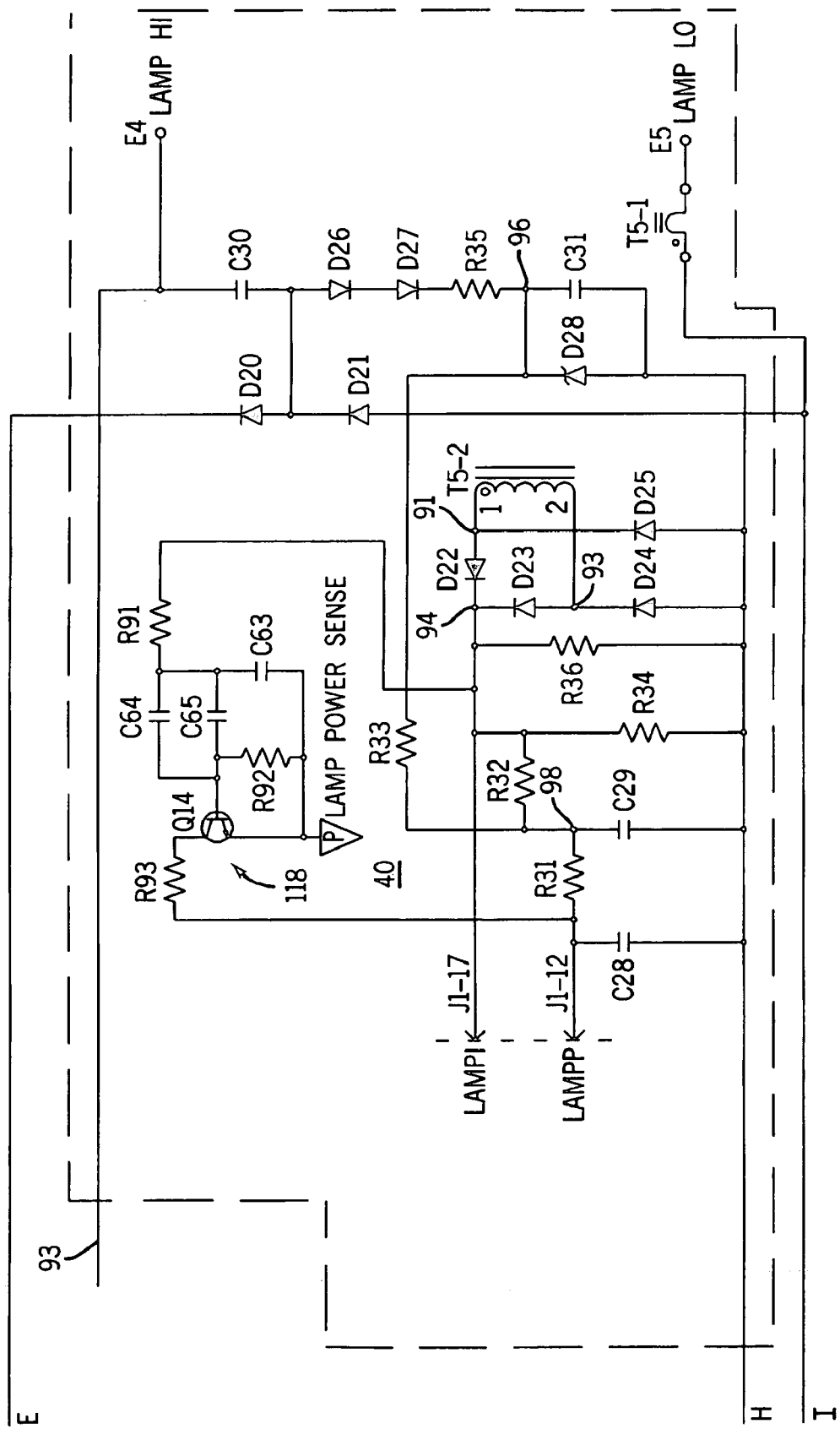
FIG. 12 is a schematic circuit diagram for an alternate power sense circuit, including an inhibit circuit, for the high frequency ballast-power supply provided by the invention.

Referring to FIGS. 12 and 8, in accordance with a feature of the invention, the feedback to the power supply controller 50 can be interrupted momentarily during the lamp ignition process to allow the resonant inverter 32 to operate at full throttle for the purpose of more reliable lamp ignition, especially in cases when a running lamp has been interrupted before reaching steady state conditions. By inhibiting the lamp power sense signal LAMPP, maximum current is delivered to the lamp immediately following breakdown, resulting in more reliable ignition. Thus, in accordance with an embellishment, the feedback to the power supply controller 50 can be interrupted using an inhibit circuit 118 whereby the lamp power sensing signal LAMPP is pulled down to ground momentarily during the lamp ignition process, interrupting regulation of the amount of power being supplied to the lamp.

More specifically, the inhibit circuit 118, which is associated with the lamp power sense circuit 40, includes a transistor Q14, an RC network including capacitors C63-C65 and resistors R91-R92 and a resistor R93. The current sense signal LAMPI, provided by the lamp power sense circuit 40 at node 94, is coupled through the RC network to the base of transistor Q14, causing the transistor Q14 to be turned on for a time interval determined by one or more time constants established by the RC network. The emitter-collector circuit of the transistor is coupled between P-ground and the jack J1-12, to which the lamp power sense signal LAMPP is extended, for momentarily grounding the jack J1-12 during the time interval for which the transistor Q14 conducts.

Operation of the Resonant Inverter

Referring to FIG. 8, when AC power is initially applied to the high frequency ballast power supply 20, the power supply controller 50 is energized and a 5V reference voltage at pin 1 of the power supply controller 50 rises rapidly. This rising edge is applied to the base of the transistor Q12 through the capacitor C44. The transistor Q12 then passes a buffered voltage to the non-inverting input (pin 2) of an internal error amplifier of the power supply controller 50, forcing the output frequency to a programmed maximum value above the open-circuit resonant frequency of the tank. As the capacitor C44 is charged through the resistor R58, the voltage at pin 2 of the power supply controller 50 falls, causing the switching frequency to sweep through the resonant curve of the open-circuit tank for igniting the HID lamp 22.

In the event that the lamp does not strike on the first sweep, capacitors C50 and C60 will be charged through a resistor R67, reaching the fault threshold of the power supply controller 50 (at pin 15). Upon detection of the fault, the outputs of the power supply controller 50 (at pins 11 and 14) are disabled, shutting down the half-bridge inverter. With the transformer T4 no longer providing voltage, the capacitor C14 storing the 15VDC housekeeping supply voltage is allowed to discharge to below the under-voltage lockout (UVLO) of the power supply controller 50, de-energizing the integrated circuit chip 50. The capacitor C50 is then discharged rapidly by the diode D34, clearing the fault condition. Likewise, the capacitor C44 is discharged by the diode D33. The ignition process then repeats once the housekeeping voltage at pin 13 of the power supply controller 50 reaches the turn-on threshold, about 5 volts above the undervoltage limit UVLO. In some implementations, the foregoing sequence does not take place. Instead an external ignitor strikes the lamp.

Referring also to FIG. 5, when the lamp is successfully started, the transformer T5 senses the lamp current, providing a full-wave voltage that is rectified by the diodes D22-D25, developing the lamp sense current signal LAMPI, a voltage representing the lamp current, across the resistors R34 and R36. Lamp voltage sensing is accomplished by the capacitor C30 and the resistor R35, and rectified by the diodes D26 and D27. The voltage sense signal is filtered by the capacitor C31 and clamped by a zener diode D28.

When the lamp is successfully started, the lamp current sense signal LAMPI, produced by the transformer T5 is applied through the resistor R68 to the base of the transistor Q13. The transistor Q13 then maintains the voltage on the capacitor C50 below the fault threshold, allowing continuous operation.

The lamp current sense signal LAMPI and the lamp voltage sense signal are summed by the resistors R32 and R33, producing a lamp power sense signal LAMPP at the junction 98 of the capacitor C29 and resistors R32 and R33. The lamp power sense signal LAMPP, which is the resulting voltage at the junction 98 of the capacitor C29 and— resistors R32 and R33, represents lamp power. The lamp power sense signal is filtered by a resistor R31 and a capacitor C28 and applied to input NI, pin 2, of the power supply controller 50, for driving a voltage controlled oscillator of the power supply controller 50.

The power supply controller 50 compares the lamp power sense signal provided at pin 2 of the power supply controller 50 to a reference produced by the resistor divider made of the resistors R59 and resistor R60 and the trim-pot R61. The lamp power sense signal is coupled through the resistor R62 to pin 4 of the power supply controller 50. The trim-pot R61 can be adjusted to calibrate the ballast power supply 20 to the desired output. Regulation is then maintained by the power supply controller 50 at that level by adjusting the switching frequency as necessary.

Interface

Referring to FIG. 9, the interface 44 provides remotely controlled fixed dimming, remotely controlled variable dimming, remotely controlled lamp enable and lamp status functions. The interface 44 includes opto-couplers 100-106 that couple the interface 44 to the resonant inverter control 36. The interface 44 includes inputs DIM 110, VAR DIM 112 and LAMP_ENA 114 and an output LAMP_STAT 116. The inputs of the interface 44 can be hard-wired to a manual control which can be wall mounted.

Remotely Controlled Fixed Dimming

The fixed dimming level of about 65% or less of full output can be activated by applying a 5V signal to input DIM 110 which is coupled to chassis ground through a resistor R42. The 5V signal is applied to opto-coupler 100 through a resistor R84. The dimming signal provided at the output of the opto-coupler 100 is then summed with the lamp power sense signal LAMPP, through a resistor R81 and OR-ing diode D42, the resultant signal being applied to pin 2 of the power supply controller 50 (FIG. 8). A capacitor C61 filters the dimming signal.

Remotely Controlled Variable Dimming

The variable dimming level of 100% to about 65% or less of full output can be commanded by applying a 5V PWM signal to input VAR DIM 112 which is coupled to chassis ground through a resistor R45. The signal is applied to the opto-coupler 102 through a resistor R74. The variable dimming signal provided at the output of the opto-coupler 102 is then filtered by a resistor R71 and a capacitor C54, summed with the lamp power sense signal, through a resistor R70 and OR-ing diode D39, the resultant signal being applied to pin 2 of the power supply controller 50. A capacitor C53 filters the variable dimming signal.

Remotely Controlled Enable

Remotely controlled enable of the ballast power supply 20 can be commanded by applying a 5V signal to input LAMP ENA 114. The lamp enable signal is applied to the opto-coupler 104 through a resistor R80. The collector of the opto-coupler 104 is then pulled low, preventing the resistor R79 from charging the capacitor C60 (FIG. 8) to the fault threshold and shutting down the outputs of the power supply controller 50. The remotely controlled enable feature can be disabled by installing a jumper, represented by the dashed line 120 in FIG. 9, between the output of the opto-coupler 104 at node 122 and B_ground.

Lamp Status

The lamp status circuit includes an opto-coupler 106, an operational amplifier 108 and associated bias components. The operational amplifier 108 has an inverting input maintained at a threshold voltage by resistors R76 and R77 and a non-inverting input coupled through a diode D40 to the plug P17 to receive the lamp current sense signal LAMPI. Whenever the lamp current sense signal LAMPI is a positive voltage, exceeding the reference level applied to the inverting input of an operational amplifier 108, the output of the operational amplifier 108 goes to a logic high level, driving the LED of the opto-coupler 106 through a resistor R78. The open-collector output of the opto-coupler 106 is pulled low, providing an indication at output terminal 116 that the lamp 22 is on.

SUMMARY

It may therefore be appreciated from the above detailed description of the preferred embodiment of the present invention that it discloses a high efficiency, high frequency ballast power supply having an operating frequency in a range that can result in increased efficiency and a higher output power than is achievable by some known electronic ballasts for driving high intensity discharge lamps. The ballast power supply may be operated at a sufficiently high frequency so as to avoid acoustic resonance in the arc tube, but low enough to minimize the effects of components of the ballast power supply, such as the core losses of magnetic components when operated at the higher frequency or the amount of bias current that is required to drive power switching devices of the ballast, both of which contribute to reduction in the efficiency of the ballast power supply. In addition, the lower operating frequency may eliminate the need for high current diodes in series and parallel with the switching devices of the ballast.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A ballast power supply for a high intensity discharge lamp, said ballast power supply comprising:
    a variable frequency voltage generating circuit for producing a regulated cyclical voltage wherein, after ignition of the lamp, said variable frequency voltage generating circuit operates to vary the frequency of the cyclical voltage over a range of frequencies with a maximum frequency of less than or equal to about 375 kHz;
    and a resonant circuit coupled to the variable frequency voltage generating circuit;
    a feedback circuit adapted to provide closed loop control using a sense signal indicative of power being supplied to the lamp; and an inhibit circuit to inhibit the sense signal for a time period following breakdown, the inhibit circuit comprising an RC network that resumes the sense signal, the time period defined by the time constant of the RC network.

2. A ballast power supply for a high intensity discharge lamp, said ballast power supply comprising:
a variable frequency voltage generating circuit for producing a regulated cyclical voltage wherein, after ignition of the lamp, said variable frequency voltage generating circuit operates to vary the frequency of the cyclical voltage over a range of frequencies with a maximum frequency of less than or equal to about 375 kHz;
a resonant circuit coupled to the variable frequency voltage generating circuit; and
an inhibit circuit for interrupting regulation of the amount of power delivered to the lamp for a time period during a portion of an ignition process following breakdown of the lamp to maximize current being delivered to the lamp during said portion of the ignition process, the inhibit circuit comprising an RC network operable to resume regulation of the amount of power delivered to the lamp, the time period defined by the time constant of the RC network.

3. The ballast power supply of claim 2 wherein said variable frequency voltage generating circuit is adapted to regulate the amount of power being delivered to the lamp.

4. The ballast power supply of claim 2 including a ground fault detection circuit for sensing unbalanced currents in the AC Input Line and Neutral connections to said ballast power supply and for terminating the supply of said cyclical voltage to the lamp for the duration of the unbalanced condition.

5. The ballast power supply of claim 2 wherein said cyclical voltage is a pseudo-sinusoidal voltage, exhibiting a harmonic distortion of less than about 15%.

6. The ballast power supply of claim 2 wherein the ballast power supply has an operating efficiency equal to or greater than about 87%.

7. The ballast power supply of claim 2 adapted to provide closed loop control using a sense signal indicative of power being supplied to the lamp.

8. The ballast power supply of claim 2 wherein the resonant circuit is adapted to produce a starting voltage for the lamp at or above the minimum frequency in said range.

9. The ballast power supply of claim 2 wherein the range of frequencies is from about 300 kHz to about 375 kHz during post-ignition.

10. The ballast power supply of claim 2 including a ground fault detection circuit adapted to sense an imbalance in the currents in the AC Input Line and Neutral connections.

11. The ballast power supply of claim 10 wherein the ground fault detection circuit is adapted to provide a signal to shut down drive to the lamp if an imbalance is sensed.

12. The ballast power supply of claim 2 wherein the lamp is adapted to be dimmed by changing the frequency of the variable frequency voltage generating circuit.

13. The ballast power supply of claim 12 including an interface circuit adapted to provide at least one of remotely controlled fixed dimming or remotely controlled variable dimming of the lamp.

14. A ballast power supply for a high intensity discharge lamp, said ballast power supply comprising:
a variable frequency voltage generating circuit for producing a regulated cyclical voltage wherein, after ignition of the lamp, said variable frequency voltage generating circuit operates to vary the frequency of the cyclical voltage over a range of frequencies with a maximum frequency of less than or equal to about 375 kHz;
a resonant circuit interposed between said variable frequency voltage generating circuit and the lamp, said resonant circuit having a reactance such that power delivered to the lamp is regulated by the frequency of the variable frequency voltage generating circuit;
a feedback circuit interposed between the lamp and the variable frequency voltage generating circuit for providing a feedback signal indicative of power being supplied to the lamp, the variable frequency voltage generating circuit responding to the feedback signal to regulate the amount of power delivered to the lamp; and
an inhibit circuit responsive to the feedback signal for interrupting regulation of the amount of power delivered to the lamp for a time period during a portion of an ignition process following breakdown of the lamp to maximize current being delivered to the lamp, the inhibit circuit comprising an RC network operable to resume regulation of the amount of power delivered to the lamp, the time period defined by the time constant of the RC network.

15. The ballast power supply of claim 14 wherein the resonant circuit is adapted to provide a starting voltage for the lamp at or above a minimum frequency.

16. The ballast power supply of claim 14 wherein the resonant circuit reactance comprises an arrangement of inductance and capacitance, and the output frequency of the variable frequency voltage generating circuit is variable over a range of frequencies that includes the resonant frequency of the reactance during the lamp ignition process and approaches the resonant frequency in post-ignition operation.

17. A lighting system comprising:
a high intensity discharge lamp; and
a ballast power supply including:
a variable frequency voltage generating circuit for producing a regulated cyclical voltage wherein, after ignition of the lamp, said variable frequency voltage generating circuit operates to vary the frequency of the cyclical voltage over a range of frequencies with a maximum frequency of less than or equal to about 375 kHz;
a resonant circuit coupled to said variable frequency voltage generating circuit for regulating power supplied to the lamp;
a feedback circuit interposed between the lamp and the variable frequency voltage generating circuit for providing a feedback signal indicative of power being supplied to the lamp, the variable frequency voltage generating circuit adapted to respond to the feedback signal to regulate the amount of power delivered to the lamp;
an inhibit circuit responsive to the feedback signal for interrupting regulation of the amount of power delivered to the lamp for a time period during a portion of an ignition process following breakdown of the lamp to maximize current being delivered to the lamp, the inhibit circuit comprising an RC network operable to resume regulation of the amount of power delivered to the lamp, the time period defined by the time constant of the RC network.

18. The lighting system of claim 17 wherein said range of frequencies is from about 300 kHz to about 375 kHz during post ignition operation.

19. The lighting system of claim 17 wherein the ballast power supply has an operating efficiency equal to or greater than at least about 87%.

20. The lighting system of claim 17 wherein said cyclical voltage is a pseudo-sinusoidal voltage exhibiting a harmonic distortion of less than about 15%.

21. The lighting system of claim 17 wherein the resonant circuit is adapted to produce a starting voltage for the lamp at or above the minimum frequency in said range.

22. A ballast power supply for a high intensity discharge lamp, said ballast power supply comprising:
a voltage generating circuit for producing a regulated DC voltage,
a resonant inverter for converting said DC voltage to a cyclical voltage at a frequency within a range of frequencies with a maximum frequency of about 375 kHz in post-ignition operation;
a resonant inverter control for controlling said resonant inverter to vary the frequency of said cyclical voltage over said range of frequencies;
a resonant circuit interposed between said resonant inverter and the lamp, said resonant circuit having a reactance such that power to the lamp varies with the frequency of said resonant inverter;
a feedback circuit interposed between the lamp and the resonant inverter control for providing a feedback signal indicative of power being supplied to the lamp, the resonant inverter control responding to the feedback signal to regulate the amount of power delivered to the lamp; and
a first sensor for providing a first sense signal indicative of current flow through the lamp, a second sensor for providing a second sense signal indicative of voltage across the lamp, a circuit to convert the current and voltage sense signals to a power sense signal, and an inhibit circuit responsive to one or more of said sense signals for inhibiting said resonant inverter control for a time period during a portion of an ignition process for the lamp, following breakdown, to maximize current begin delivered to the lamp, the inhibit circuit comprising an RC network operable to resume regulation of the amount of power delivered to the lamp, the time period defined by the time constant of the RC network.

23. The ballast power supply of claim 22 wherein the resonant circuit has a reactance such that said resonant circuit resonates to provide a starting voltage for the lamp at or above the minimum frequency in said range.

24. The ballast power supply of claim 22 wherein said range of frequencies is from about 300 kHz to about 375 kHz during post-ignition operation.

25. The ballast power supply of claim 22 wherein said cyclical voltage is a pseudo-sinusoidal voltage, and wherein said pseudo-sinusoidal voltage exhibits harmonic distortion of less than about 15%.

26. The ballast power supply of claim 22 including a sensing circuit for producing a sense signal indicative of current flow through the lamp, and an inhibit circuit responsive to said sense signal for inhibiting said resonant inverter control for a time period during a portion of an ignition process for the lamp, following breakdown, to maximize current being delivered to the lamp.

27. The ballast power supply of claim 22 including a ground fault detection circuit for sensing unbalanced currents in the AC Input Line and Neutral connections to said ballast power supply and causing the supply of said cyclical voltage to the lamp to be terminated for the duration of the unbalanced condition.

28. The ballast power supply of claim 22 having an operating efficiency equal to or greater than at least about 87%.

* * * * *